US012576880B2

(12) United States Patent
Mallik et al.

(10) Patent No.: US 12,576,880 B2
(45) Date of Patent: Mar. 17, 2026

(54) CONTEXT AWARE OPTIMIZATION OF PLANNER FOR AUTONOMOUS DRIVING

(71) Applicant: Robert Bosch GmbH, Stuttgart (DE)

(72) Inventors: Abhirup Mallik, Santa Clara, CA (US); Tommaso Nesti, Mountain View, CA (US); Burhaneddin Yaman, San Jose, CA (US); Alessandro Allievi, Durham, NC (US); Jarrett Holtz, Pflugerville, TX (US)

(73) Assignee: Robert Bosch GmbH (DE)

( * ) Notice: Subject to any disclaimer, the term of this patent is extended or adjusted under 35 U.S.C. 154(b) by 150 days.

(21) Appl. No.: 18/388,614

(22) Filed: Nov. 10, 2023

(65) Prior Publication Data

US 2025/0153731 A1    May 15, 2025

(51) Int. Cl.
*B60W 60/00* (2020.01)
*B60W 40/06* (2012.01)
*G06V 20/58* (2022.01)

(52) U.S. Cl.
CPC .......... *B60W 60/001* (2020.02); *B60W 40/06* (2013.01); *G06V 20/58* (2022.01); *B60W 2420/403* (2013.01)

(58) Field of Classification Search
CPC .............. B60W 60/001; B60W 40/06; B60W 2420/403; B60W 2420/408; G06V 20/56; G06V 20/58
See application file for complete search history.

(56) References Cited

U.S. PATENT DOCUMENTS 12,158,762 B1    12/2024  O'Hara et al.
2022/0230016 A1*  7/2022  Ahamed .............. G06F 18/2113
2022/0332317 A1*  10/2022  Lewandowski ..... B60W 30/146
(Continued)

FOREIGN PATENT DOCUMENTS

CN        111002980 A  *  4/2020  .......... G06F 18/214
CN        114071013 B  *  6/2023  ............. H04N 23/61
DE    102020202476 A1  *  8/2021  ............. G06V 20/56

OTHER PUBLICATIONS

Jaime Fernández, "Error Metrics for Trajectory Prediction Accuracy", Feb. 7, 2019, Wordpress (Year: 2019).*
(Continued)

*Primary Examiner* — Erin M Piateski
*Assistant Examiner* — Ashley Tiffany Schoech
(74) *Attorney, Agent, or Firm* — Dickinson Wright PLLC

(57)        ABSTRACT
Systems and methods for optimizing a planning model for autonomous driving. Image data is generated from a vehicle camera. A perception model detects agents in the environment based on the image data. A planner model is executed to generate a predicted trajectory of the vehicle based upon configuration parameters associated with characteristics of the vehicle. Information regarding a context associated with the detected agents is received from the perception model. An optimizer is configured to select a subset of the configuration parameters to be optimized based on the context, select an objective function based on the context, adjust the selected subset of configuration parameters based on a current value of the objective function, generate a new planned trajectory, derive a value of the objective function, and determine optimal configuration parameters that minimize the objective function.

20 Claims, 5 Drawing Sheets

$400$

(56)          References Cited

U.S. PATENT DOCUMENTS

| 2023/0252795 A1 | 8/2023 | Tong et al. |
| 2023/0278587 A1* | 9/2023 | Wu .......................... G06T 7/246 |
| | | 701/28 |
| 2024/0087136 A1* | 3/2024 | Waez ................ B60W 60/0027 |
| 2024/0300490 A1* | 9/2024 | Yang .................... B60W 30/12 |

OTHER PUBLICATIONS

Mrinal Kalakrishnan et al., "STOMP: Stochastic Trajectory Optimization for Motion Planning", May 13, 2011, IEEE, pp. 4569-4574 (Year: 2011).*

Yukang Kou and Changxi Ma, "Dual-objective intelligent vehicle lane changing trajectory planning based on polynomial optimization", Mar. 9, 2023, Elsevier, No. 128665, pp. 1-16 (Year: 2023).*

Sampurna Mandal et al., "Motion Prediction for Autonomous Vehicles from Lyft Dataset using Deep Learning", Oct. 31, 2010, IEEE, 5th ICCCA, pp. 768-773 (Year: 2010).*

Nathan Ratliff et al., "CHOMP: Gradient Optimization Techniques for Efficient Motion Planning", May 17, 2009, IEEE, pp. 489-494 (Year: 2009).*

Rahel Vortmeyer-Kley et al., "A trajectory based loss function to learn missing terms in bifurcating dynamical systems", 2011, Scientific Reports, pp. 1-13 (Year: 2011).*

Olov Andersson et al., "Model-Predictive Control with Stochastic Collision Avoidance using Bayesian Policy Optimization", May 21, 2016, IEEE, 2016 ICRA, pp. 4597-4604 (Year: 2016).*

Xiao et al., "APPLD: Adaptive Planner Parameter Learning From Demonstration," IEEE Robotics and Automation Letters, vol. 5, No. 3, Jul. 2020, 7 pages.

Larson et al., "Derivative-free optimization methods," arXiv:1904.11585v2 [math.OC] Jun. 25, 2019, 94 pages.

Hu et al., "Planning-oriented Autonomous Driving," Computer Vision Foundation, 10 pages.

Radford et al., "Learning Transferable Visual Models From Natural Language Supervision," Proceedings of the 38th International Conference on Machine Learning, PMLR 139, 2021, 16 pages.

Learning Transferable Visual Models From Natural Language Supervision, to Radford et al. pp. 1-48 published Feb. 2021 (Year: 2021).

* cited by examiner

Figure 2:
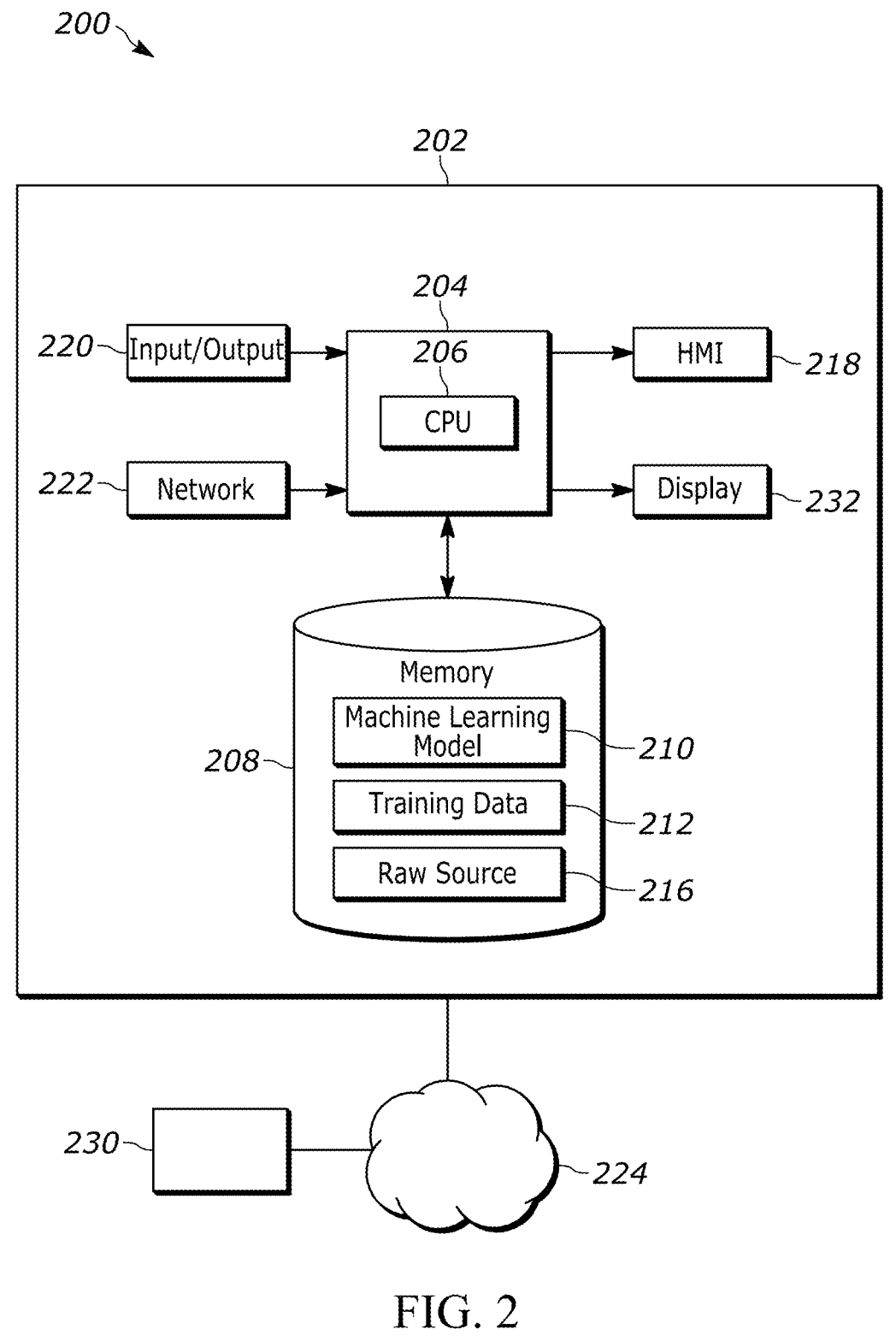

*200*

*202*

*204*

220  Input/Output

*206*

CPU

HMI  218

222  Network

Display  232

208

Memory

Machine Learning Model  210

Training Data  212

Raw Source  216

CONTEXT AWARE OPTIMIZATION OF PLANNER FOR AUTONOMOUS DRIVING

TECHNICAL FIELD

The present disclosure relates to methods and systems for context aware optimization of a planner model for autonomous driving.

BACKGROUND

An autonomous vehicle, often referred to as a self-driving or driverless vehicle, is a type of vehicle capable of navigating and operating on roads and in various environments without direct human control. Autonomous vehicles use a combination of advanced technologies and sensors to perceive their surroundings, make decisions, and execute driving tasks.

Autonomous vehicles are typically equipped with a variety of sensors, including lidar, radar, cameras, ultrasonic sensors, and sometimes additional technologies like GPS and IMUs (Inertial Measurement Units). These sensors provide real-time data about the vehicle's surroundings, including the positions of other vehicles, pedestrians, road signs, and road conditions. The vehicle's onboard computers use data from sensors to create a detailed map of the environment and to perceive objects and obstacles. This information is essential for navigation and collision avoidance.

BRIEF DESCRIPTION OF THE DRAWINGS

FIG. 2 shows a computer-implemented method for training and utilizing a neural network, according to an embodiment.

DETAILED DESCRIPTION

Figure 1:
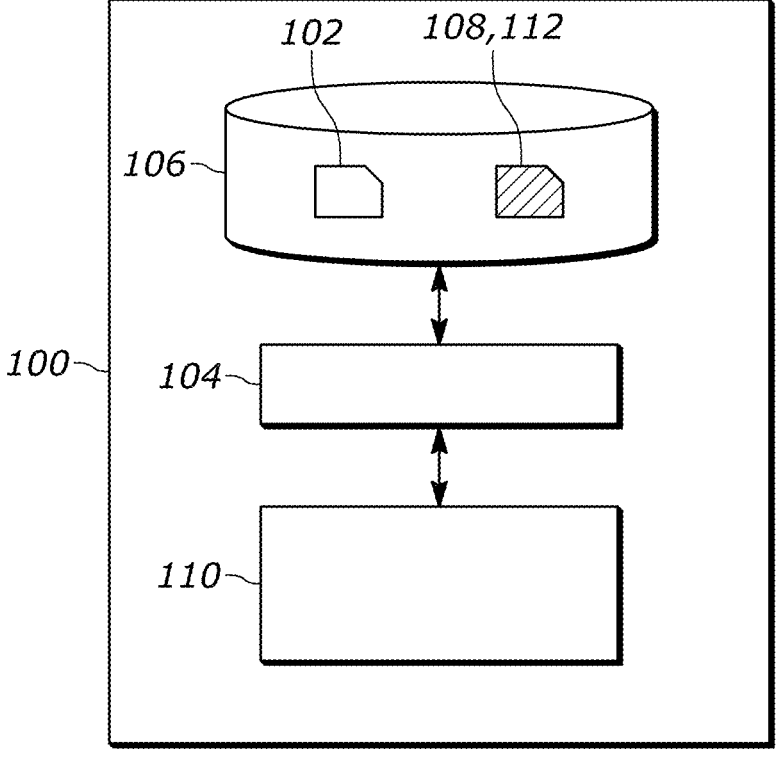
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the context of autonomous vehicles, the term "agent" can refer to objects or entities in the environment that surrounds or interacts with the autonomous vehicle. This includes pedestrians, other vehicles, cyclists, road signs, traffic lights, lane lines, and the like. Objects or features that are being detected by the autonomous vehicle's sensors for use in decision making in controlling the autonomous vehicle can be collectively referred to as agents.

This disclosure incorporates by reference, in its entirety, U.S. patent application Ser. No. 18/388,606, filed on the same day as this disclosure, and titled "SYSTEMS AND METHODS FOR VISION-LANGUAGE PLANNING (VLP) FOUNDATION MODELS FOR AUTONOMOUS DRIVING."

This disclosure incorporates by reference, in its entirety, U.S. patent application Ser. No. 18/388,601, filed on the same day as this disclosure, and titled "VISON-LAN-GUAGE-PLANNING (VLP) MODELS WITH AGENT-WISE LEARNING FOR AUTONOMOUS DRIVING."

Rapid advancements in autonomous driving technology have ushered in a new era of transportation, promising safer and more efficient journeys. Autonomous driving systems generally include three high-level tasks: (1) perception, (2) prediction, and (3) planning. Perception involves the vehicle's ability to understand and interpret its environment. This task includes various sub-components like computer vision, sensor fusion, and localization. Key elements of perception include object detection (e.g., identification and tracking agents external to the autonomous vehicle), localization (e.g., determining the vehicle's precise position and orientation in the world, often using GPS and other sensors), and sensor fusion (e.g., combining data from different sensors, such as cameras, lidar, radar, and ultrasonic sensors to build a comprehensive view of the surroundings). Prediction involves anticipating how other road users and agents in the environment will behave in the near future. This task often involves using machine learning models to estimate the trajectories and intentions of the agents, including pedestrians, other vehicles, and potential obstacles. Accurate prediction is crucial for making safe driving decisions. Planning involves determining the optimal path and actions for the autonomous vehicle to navigate its environment. The planner (also referred to as the planner module or planner model) is an autonomous driving software stack that is responsible for planning the trajectory of the autonomous vehicle. This typically includes tasks like route planning, trajectory planning, and decision-making. The planning system considers information from perception and prediction to make decisions such as when to change lanes, when to stop at an intersection, how to react to unexpected events, and the like.

In autonomous driving development, planning the autonomous vehicle's motion is a crucial component. The planner model's output trajectory depends on a set of configuration parameters $param_{orig}$ that affect the way the planner makes decisions, and on environment information collected through the perception, localization and prediction modules of the autonomous driving stack as exemplified below:

trajectory=planner(param$_{orig}$,environment)

Such configuration parameters param$_{orig}$ can include thresholds for certain maneuvers like turns or lane changes, size of the action space to search on, acceleration, deceleration, length of drive, distance to the vehicle in front of the autonomous vehicle (EGO vehicle), steering angles, and other characteristics of the autonomous vehicle. These parameters have been set by software developers at a global level, meaning a common set of parameters are designed to handle all traffic scenarios or contexts, and in the past are not changed once in production.

However, the planner needs to be adaptable to various driving conditions and traffic contexts to operate accurately. Therefore, according to various embodiments disclosed herein, these parameters param$_{context}$ are adjusted based on the scenario or context to improve the planner model's performance. This disclosure proposes a framework for finding the optimized parameter set param$_{context}$ for a set of specific driving contexts, wherein a context is an expert-defined function of the current environment:

trajectory=planner(param$_{context}$,environment)

param$_{context}$=ContextAwareOptimization(param$_{orig}$, context)

context=$f$(environment)

Here, ContextAwareOptimization is an optimization routine that takes as input a driving context and the set of original parameters, and computes the set of parameters param$_{context}$ that achieves optimal planning performance for a particular context. As will be described further below, the context that is used to adjust the parameters can be based on the sensed movement of the agents, as well as map or road characteristics (e.g., whether the traveled road is a highway versus an urban street versus a roundabout, etc.). The map or road characteristics can be recalled from storage based upon the vehicle previously traveling over the road, or can be accessed via wireless communication based on another vehicle previously traveling the road. The context can be determined by the perception model, and passed to the optimizer for optimizing the planner model.

Machine learning and neural networks are an integral part of the inventions disclosed herein. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106.

The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive, as input, an output of a previous layer, or for a first layer of the stack of layers, an initial activation and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may, during or after the training, be replaced at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The system 100 shown in FIG. 1 is one example of a system that may be utilized to train the machine learning models described herein.

FIG. 2 depicts a system 200 to implement the machine-learning models described herein, for example the planner model. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, touch screen, etc. Examples of output devices include monitors, touchscreens, speakers, head-up displays, vehicle control systems, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any device that enables the system 200 to receive control input.

The computing system 202 may include a display device 232. The computing system 202 may include hardware and software for outputting graphics and text information to the display device 232. The display device 232 may include an electronic display screen, projector, speaker or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate one or more of the machine learning models described herein, including the VLP Foundation model.

The computing system 202 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified. The training dataset 212 may also include the text description of the scene (e.g., "the pedestrian is crossing the street") that corresponds to the images detected by the vehicle sensors.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data. In the context of the planner model described herein, a loss between the predicted trajectory of the autonomous vehicle and the ground truth trajectory of the vehicle can be determined, and the model can be trained with an optimizer to reduce this loss, e.g. to convergence.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of agents in video images, annotate the occurrences, and/or command the vehicle to take a specific action (planning) based on the locational data of the agent (perception) and the predicted future movement/location of the agent (prediction). The machine-learning algorithm 210 may be programmed to process the raw source data 216 to identify the presence of the particular features. The machine-learning algorithm 210 may be configured to identify a feature in the raw source data 216 as a predetermined feature (e.g., road sign, pedestrian, etc.). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

Figure 3:
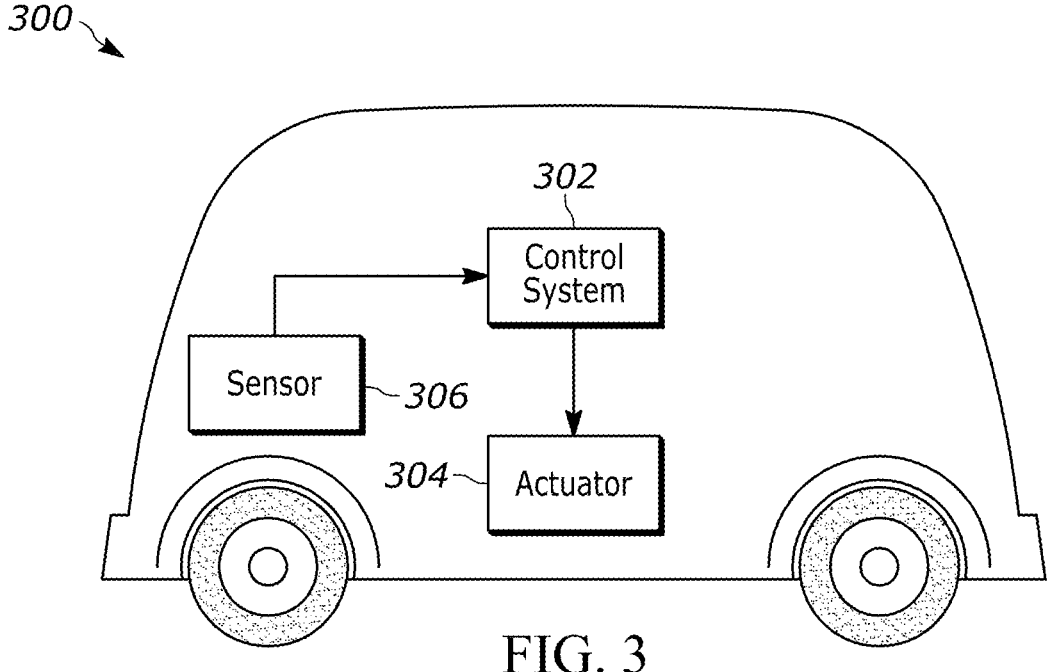
FIG. 3 shows a schematic diagram of a control system configured to control a vehicle, which may be a partially autonomous vehicle, a fully autonomous vehicle, a partially autonomous robot, or a fully autonomous robot, according to an embodiment.

FIG. 3 depicts a schematic diagram of control system 302 configured to control vehicle 300, which may be a partially autonomous vehicle or fully autonomous vehicle, partially autonomous robot or fully autonomous robot. The vehicle 300 and/or its control system 302 can incorporate one or more components of the system 200, such as computing system 202 in order to command an actuator 304 to perform a certain action based upon processing readings from one or more sensors 306. For example, control system 302 can be configured to utilize the planning model disclosed herein in order to control movement of the vehicle via actuator 304, with the planning model being trained via the optimizer.

The one or more sensors 306 may include one or more image sensors (e.g., camera, video sensors, radar sensors, ultrasonic sensors, LiDAR sensors), and/or position sensors (e.g. GPS). The sensors 306 can be configured to generate raw source data 216. One or more of the one or more specific sensors may be integrated into vehicle 300. In the context of agent recognition and processing as described herein, the sensor 306 is a camera mounted to or integrated into the vehicle 300. Alternatively or in addition to one or more specific sensors identified above, sensor 306 may include a software module configured to, upon execution, determine a state of actuator 304. The data generated from these sensors can be fused or otherwise combined to create a bird-eye-view (BEV) that provides spatiotemporal information associated with the vehicle and the detected agents in the environment.

In embodiments where vehicle 300 is a fully or partially autonomous vehicle, actuator 304 may be embodied in a brake, an accelerator, a propulsion system, an engine, a drivetrain, or a steering system (e.g., steering wheel) of vehicle 300. Actuator control commands may be determined such that actuator 304 is controlled such that vehicle 300 avoids collisions with detected agents, for example. Detected agents may also be classified according to what classifier deems them most likely to be, such as pedestrians or trees. The actuator control commands may be determined depending on the classification.

In other embodiments where vehicle 300 is a fully or partially autonomous robot, vehicle 300 may be a mobile robot that is configured to carry out one or more functions, such as flying, swimming, diving and stepping, via actuator 304. The mobile robot may be an at least partially autonomous lawn mower or an at least partially autonomous cleaning robot. In such embodiments, the actuator control command may be determined such that a propulsion unit, steering unit and/or brake unit of the mobile robot may be controlled such that the mobile robot may avoid collisions with identified objects.

Figure 4:
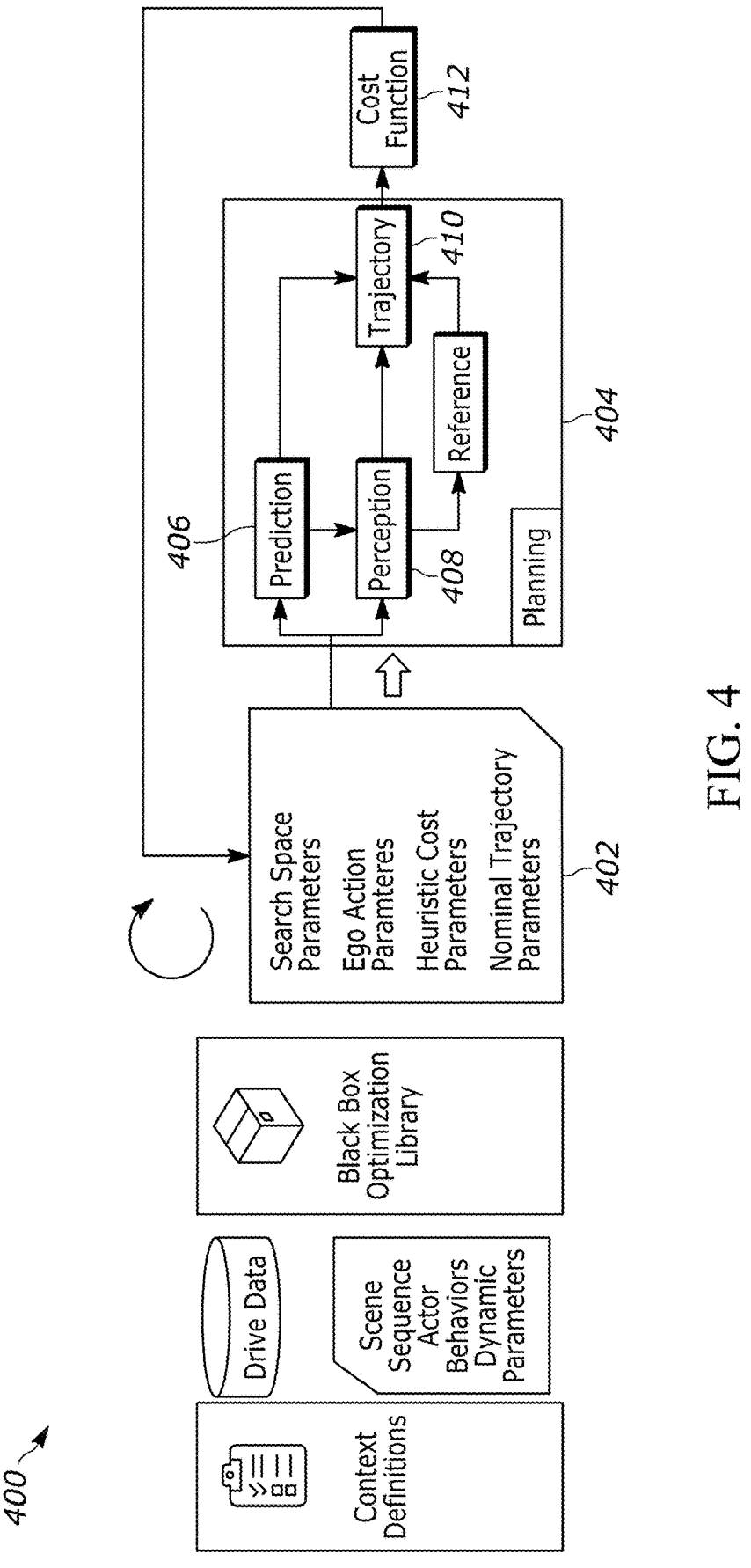
FIG. 4 illustrates a schematic diagram of a system implementing an optimizer configured to optimize performance of the planner model, according to an embodiment.

FIG. 4 illustrates a schematic diagram of a system 400 implementing a optimizer 402 configured to optimize performance of the planner model 404. The planning model 404 can be one such as the planning models disclosed in U.S. patent application Ser. No. 18/388,606, filed on the same day as this disclosure, and titled "SYSTEMS AND METHODS FOR VISION-LANGUAGE PLANNING (VLP) FOUNDATION MODELS FOR AUTONOMOUS DRIVING." For example, a planning query can contain both perception information and prediction information from the perception model and prediction model, respectively. The planning query can be configured to extract planning information by utilizing a birds-eye-view (BEV) feature map. The BEV is a fusion of information sensed from the various vehicle sensors (e.g., camera, lidar, radar, etc.) that correspond to the agents surrounding the vehicle. Using the BEV and all of the data thereon as determined from the perception and prediction models, the planning model plans an appropriate route of the vehicle. Vectors can be used along with a planning decoder that extracts visual planning features using the planning query and BEV features. The features extracted from the BEV can include information about the agents in the environment, such as their location, their trajectory, and the like as described above, which are inputs to determine how the autonomous vehicle itself should react. Neural networks can map high dimensional input to the expected timestamped trajectory of the vehicle. The illustrated items to the left of the optimizer 402 in FIG. 4 can be stored in memory and recalled for execution.

As shown in the embodiment illustrated in FIG. 4, the planning model 404 can include data output from the prediction model 406, as well as the perception model 408 including sensed behavior of the agents in the environment. Using the extracted information from the prediction model 406 and the perception model 408, the planning model can output a predicted trajectory 410 of the autonomous vehicle. This can be done according to the methods described in the patent references that are incorporated by reference above.

The optimizer 402 is configured to optimize parameters used by the planning model 404 in order to improve the predicted trajectory 410. As explained above, the trajectory 410 output by the planner depends on a set of configuration parameters that affect the way the planner makes decisions. Such parameters can include thresholds for certain maneuvers like turns or lane changes, acceleration of the vehicle, deceleration of the vehicle, turning, spacing, and the like of the vehicle. These parameters are typically set at a global level. The optimizer 402 is configured to find an optimized parameters set $param_{context}$ for a set of given driving contexts. The optimizer 402 takes as input a driving context(s) and the set of original parameters, and computes a set of optimized or adjusted parameters that achieve optimal planning performance for a particular context or scenario. Once optimized, the software can be integrated into a self-driving stack. It can be used as a developer tool to improve development of new self-driving features, and eventually implemented into the autonomous vehicle itself.

The optimizer 402 can be executed using computing system 202, for example. In operation (e.g., during execution of the optimizer), the computing system re-computes the planner output (e.g., predicted trajectory) based on different sets of parameters for a given driving scenario. This is achieved using data from past real drives (ground truth), then re-running the planner on a replay of the drive using the new set of parameters. The output (e.g., predicted trajectory) of that run is stored in memory (e.g., on disk).

This process can be repeated, with each iteration resulting in a new predicted trajectory that is stored.

The computer system can then calculate a cost function 412. The cost function is defined based on the target behavior desired to be improved. For example, did the predicted trajectory deviate from the actual trajectory by a large margin? Did the predicted trajectory predict a harsher deceleration than was actually present in the ground truth? The planner model have has various planning-related behaviors that are configured independently using different sets of parameters. Thus, the choice of cost function also influences which parameters to update or alter. Cost functions can take various forms, depending on what needs to be improved.

In one embodiment, the cost function 412 evaluates nominal trajectory differences. As a subtask of planning, the system predicts the trajectory of the autonomous vehicle for the planning horizon, known as nominal trajectory or predicted trajectory. However, the nominal trajectory could be different from the executed trajectory due to differences between planning and execution. To ensure safe and reliable planning, it is important that the nominal trajectory is as close to the executed trajectory as possible. Therefore, the cost function can be defined as an average displacement error between the nominal trajectory and the planned trajectory over the observation window.

In one embodiment, the cost function 412 evaluates the planning cost. As part of the planning model, the system searches for the sequence of actions that minimizes a cost, such as acceleration, deceleration, fuel consumption, abrupt turns, etc. This cost can also be used for optimizing planning parameters. For example, planning cost is low when the vehicle makes progress towards its goal subject to constraints of traffic, safety rules, and rider comfort. A better set of parameters should enable the vehicle to achieve lower planner cost at each timepoint, hence an average cost over the drive could be considered a target for optimization. In short, usage of different parameters, depending on the driving scenario (e.g., traffic, speed, etc.) can enable the vehicle to improve the driving experience for the riders at multiple times, thus resulting in an overall better driving experience.

Whatever the type of cost function used, the optimizer 402 is configured to produce next candidate parameters to evaluate the cost function. An efficient optimizer would produce a parameter set with improved cost in a smaller number of iterations. As the gradient of the cost functions for these problem may not be accessible by the provider of the optimizer, the system can be limited to using gradient free optimizers in embodiments. The framework of this optimizer is compatible with any gradient free/black-box style optimizers including Bayesian optimization, generic algorithms, particle swarm or any meta-heuristics based algorithms.

The above described system 400 can have several training applications. For example, during training, the system can receive context information or context definition from the perception model. Such context information can include the past and current path traveled by the agents (e.g., other vehicles), their relative speeds, directions, and the like. The context information can also include characteristics of the road being traveled by the vehicle. Agents typically behave differently on a highway versus an urban road where speed limits are much lower and typically other pedestrians and/or objects may be crossing the road or adjacent the vehicles. Therefore, the system can leverage map information (e.g., from GPS) that indicates the type of road being traveled on. This context information can be used by the optimizer 402 to change the parameters during training. The training can complete with several iterations, and the optimizer can output an optimized planning performance for a particular context or scenario. Thus, when put into production, the operation of the autonomous vehicle can be optimized for different driving contexts (e.g., based on how the other agents are behaving and/or the differences in the road being traveled). In other embodiments, the system can leverage data used by a localization and mapping system (e.g., simultaneous localization and mapping models, SLAM) that stores data associated with the routes being traveled by the vehicle or other vehicles, and makes that data available when the vehicle is driven across the road that has already been mapped previously.

Figure 5:
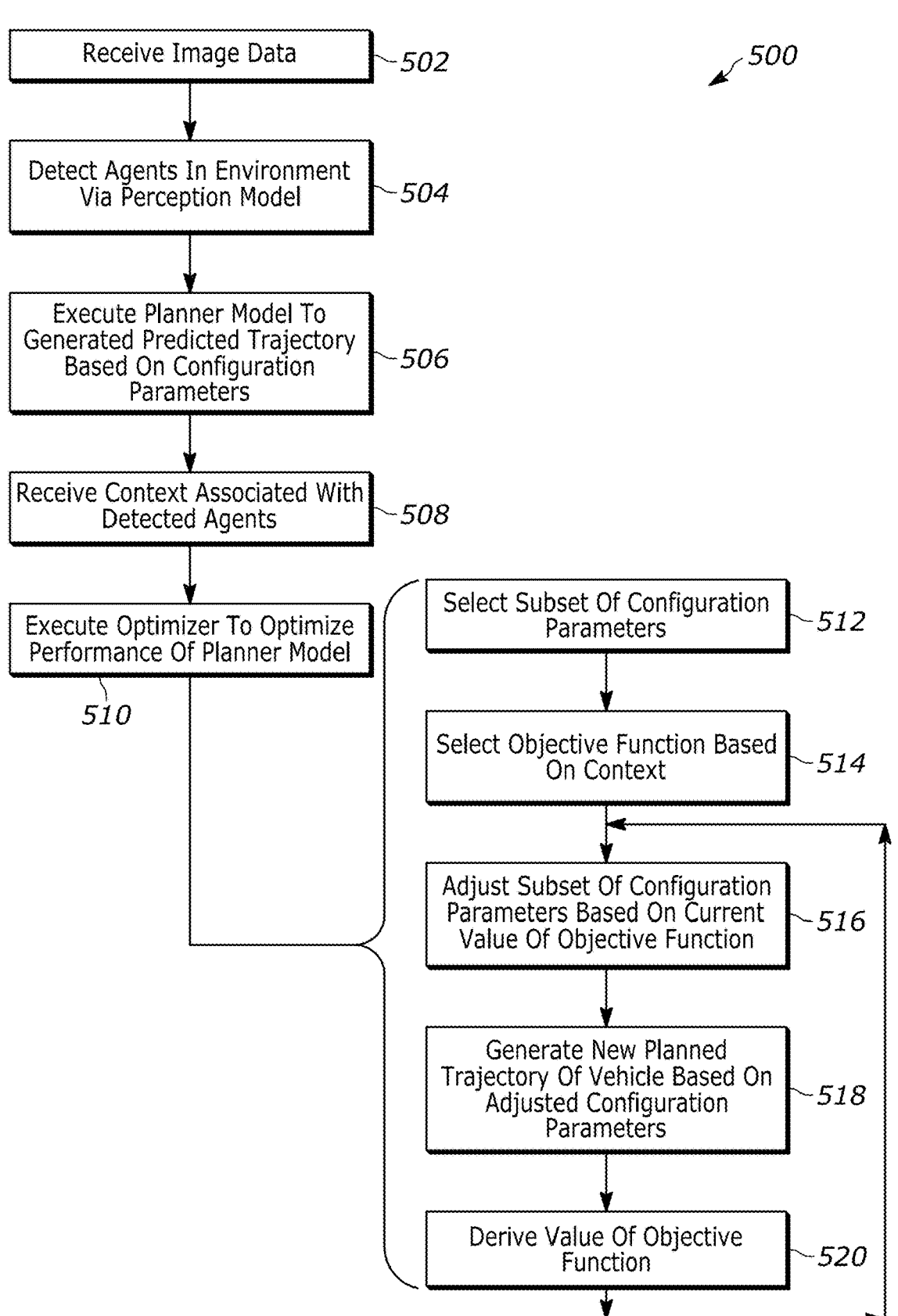
FIG. 5 is method for optimizing a planner model, according to an embodiment.

FIG. 5 illustrates a method 500 for optimizing a planner model, according to an embodiment. The method can be implemented or executed using one or more of the processors described herein. While only one processor may be described at one or more of the steps below, it should be understood that more than one processor can collectively be used to perform the method.

At 502, image data generated from a camera mounted to a vehicle is received by the processor. The image data includes agents (e.g., vehicles, pedestrians, buildings, cyclists, etc.) in an environment outside of the vehicle. At 504, a pre-existing perception model is used to detect the agents in the environment based on the image data. Image processing, neural networks and other machine learning techniques, along with sensor fusion, can be used by the perception model, which has the goal of determining the real-time movement characteristics of the agents in the sensed environment. This includes the agents' location, orientation, speed, whether the vehicle is turning, accelerating, braking, and the like.

At 506, a planner model is executed in order to generate a predicted trajectory of the vehicle. This can include a predicted movement, acceleration, deceleration, turning, etc. of the vehicle. This predicted trajectory is dependent upon a set of configuration parameters $param_{context}$ associated with characteristics of the vehicle. For example, the parameters can include thresholds for certain maneuvers like turns, lane changes, speed, and other maneuvering commands.

At 508, the processor receives, from the perception model, information regarding a context associated with the detected agents in the environment. This context can include, for example, the speed, orientation, angle, turning, size, type (e.g., truck, van, bus), and the like associated with the agent. In some embodiments, this context can also be associated with the type of road being traveled, for example whether the road is a highway, on/off ramp, roundabout, urban street, parking lot, or the like. This is considered by the optimizer because agents behave differently in different scenarios, and thus the optimizer optimizes performance of the planner based on the different context of the agents and/or road.

At 510, the optimizer is executed. The optimizer can be a black-box optimizer configured to optimize the performance of the planner model based on the context. Execution of the optimizer can include performance of 512-520 as explained below and described more above.

At 512, the optimizer selects a subset of the configuration parameters to be optimized based on the context. At 514, the optimizer selects an objective function based on the context. For example, the objective function can be a cost function configured to optimize nominal trajectory, or can be a cost function configured to optimize a planning cost. At 516, the optimizer adjusts the selected subset of the configuration parameters based on a current value of the objective function. At 518, the optimizer generates a new planned trajectory of the vehicle based on the adjusted configuration parameters. At 520, the optimizer derives a value of the objective function (e.g., cost function) based on the new planned trajectory. Steps 516-520 can then be repeated through several iterations to determine optimal configuration parameters that minimize the objective function. This can be based on convergence, for example, where the new predicted trajectories at the iterations align with the actual ground-truth trajectory of the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for optimizing a planner model for autonomous driving, the method comprising:
   receiving image data generated from a camera mounted to a vehicle, wherein the image data includes agents in an environment outside the vehicle;
   via a pre-existing perception model, detecting the agents in the environment based on the image data;
   executing a planner model to generate a predicted trajectory of the vehicle, wherein the generated predicted trajectory of the vehicle is dependent upon a set of configuration parameters associated with characteristics of the vehicle;

receiving, from the perception model, information regarding a context associated with the detected agents in the environment, wherein the context comprises both (i) predicted motion vectors for each detected agent in the environment and (ii) categorical road-type label regarding a type of road; and
   executing a black-box optimizer configured to optimize performance of the planner model based on the context, wherein execution of the optimizer:
      (1) selects a subset of the configuration parameters to be optimized based on the context,
      (2) selects an objective function based on the context,
      (3) adjusts the selected subset of the configuration parameters based on a current value of the objective function,
      (4) generates a new planned trajectory of the vehicle based on the adjusted configuration parameters,
      (5) derives a value of the objective function based on the new planned trajectory, and
      (6) repeats (3)-(5) to determine optimal configuration parameters that minimize the objective function.

2. The method of claim 1, wherein the black-box optimizer is a Bayesian optimizer.

3. The method of claim 1, wherein the subset of configuration parameters is related to a vehicle controller system;
   wherein the selected objective function includes an average displacement error calculated by, for each subset of configuration parameters evaluated during the optimization, generating a planned trajectory of the vehicle and determining the average displacement error between the planned trajectory and a ground-truth trajectory of the vehicle, wherein the ground-truth trajectory is obtained from previously recorded sensor data prior to execution of the optimizer.

4. The method of claim 3, wherein execution of the optimizer:
   samples the subset of the configuration parameters,
   generates the new planned trajectory based on the adjustment of the selected subset of the configuration parameters, and
   calculates the average displacement error.

5. The method of claim 1, wherein the planning model includes a planning algorithm, and the subset of configuration parameters are related to the planning algorithm;
   wherein the selected objective function includes a loss function of the planning algorithm.

6. The method of claim 5, wherein execution of the optimizer:
   samples the subset of the configuration parameters,
   generates the new planned trajectory based on the adjustment of the selected subset of the configuration parameters, and
   calculates the loss function of the planning algorithm.

7. The method of claim 1, wherein the detecting of the agents in the environment is further based on a pre-existing localization model.

8. The method of claim 1, further comprising:
   receiving sensor data from sensors mounted to the vehicle, wherein the sensors are not cameras,
   wherein the detecting of the agents in the environment is further based on the sensor data.

9. The method of claim 1, wherein the context associated with the detected agents is associated with movement of the detected agents and a characteristic of a road that the vehicle is traveling on.

10. The method of claim 1, wherein the characteristic of the road that the vehicle is traveling on includes whether the road is one of a highway, urban road, or roundabout.

11. A system for optimizing a planner model for autonomous driving, the system comprising:

a processor; and memory including instructions that, when executing by the processor, cause the processor to perform the following steps:

receiving image data generated from a camera mounted to a vehicle, wherein the image data includes agents in an environment outside the vehicle;

via a pre-existing perception model, detecting the agents in the environment based on the image data;

executing a planner model to generate a predicted trajectory of the vehicle, wherein the generated predicted trajectory of the vehicle is dependent upon a set of configuration parameters associated with characteristics of the vehicle;

receiving, from the perception model, information regarding a context associated with the detected agents in the environment, wherein the context comprises both (i) predicted motion vectors for each detected agent in the environment and (ii) categorical road-type label regarding a type of road; and executing a black-box optimizer configured to optimize performance of the planner model based on the context, wherein execution of the optimizer:

(1) selects a subset of the configuration parameters to be optimized based on the context, (2) selects an objective function based on the context, (3) adjusts the selected subset of the configuration parameters based on a current value of the objective function, (4) generates a new planned trajectory of the vehicle based on the adjusted configuration parameters, (5) derives a value of the objective function based on the new planned trajectory, and (6) repeats (3)-(5) to determine optimal configuration parameters that minimize the objective function.

12. The system of claim 11, wherein the black-box optimizer is a Bayesian optimizer.

13. The system of claim 11, wherein the subset of configuration parameters is related to a vehicle controller system; and wherein the selected objective function includes an average displacement error calculated by, for each set of configuration parameters evaluated during the optimization, generating a planned trajectory of the vehicle and determining the average displacement error between the planned trajectory and a ground-truth trajectory of the vehicle, wherein the ground-truth trajectory is obtained from previously recorded sensor data prior to execution of the optimizer.

14. The system of claim 13, wherein execution of the optimizer:

samples the subset of the configuration parameters, generates the new planned trajectory based on the adjustment of the selected subset of the configuration parameters, and calculates the average displacement error.

15. The system of claim 11, wherein the planning model includes a planning algorithm, and the subset of configuration parameters are related to the planning algorithm;

wherein the selected objective function includes a loss function of the planning algorithm.

16. The system of claim 15, wherein execution of the optimizer:

samples the subset of the configuration parameters, generates the new planned trajectory based on the adjustment of the selected subset of the configuration parameters, and calculates the loss function of the planning algorithm.

17. The system of claim 11, wherein the detecting of the agents in the environment is further based on a pre-existing localization model.

18. The system of claim 11, wherein the instructions are further configured to, when executed by the processor, cause the processor to perform the following:

receiving sensor data from sensors mounted to the vehicle, wherein the sensors are not cameras, wherein the detecting of the agents in the environment is further based on the sensor data.

19. The system of claim 11, wherein the context associated with the detected agents is associated with movement of the detected agents and a characteristic of a road that the vehicle is traveling on.

20. A non-transitory computer-readable storage medium comprising instructions that, when executed by a processor, cause the processor to perform:

receive image data generated from a camera mounted to a vehicle, wherein the image data includes agents in an environment outside the vehicle;

via a pre-existing perception model, detect the agents in the environment based on the image data;

execute a planner model to generate a predicted trajectory of the vehicle, wherein the generated predicted trajectory of the vehicle is dependent upon a set of configuration parameters associated with characteristics of the vehicle;

receive, from the perception model, information regarding a context associated with the detected agents in the environment, wherein the context comprises both (i) predicted motion vectors for each detected agent in the environment and (ii) categorical road-type label regarding a type of road; and execute a Bayesian optimizer configured to optimize performance of the planner model based on the context, wherein execution of the optimizer:

(1) selects a subset of the configuration parameters to be optimized based on the context, (2) selects an objective function based on the context, (3) adjusts the selected subset of the configuration parameters based on a current value of the objective function, (4) generates a new planned trajectory of the vehicle based on the adjusted configuration parameters, (5) derives a value of the objective function based on the new planned trajectory, and (6) repeats (3)-(5) to determine optimal configuration parameters that minimize the objective function.

* * * * *